US012555452B2

(12) United States Patent
Ammari

(10) Patent No.: US 12,555,452 B2
(45) Date of Patent: Feb. 17, 2026

(54) REAL-TIME SAFETY MANAGEMENT SYSTEM AND METHOD

(71) Applicant: Hatem Ammari, Houston, TX (US)

(72) Inventor: Hatem Ammari, Houston, TX (US)

( * ) Notice: Subject to any disclaimer, the term of this patent is extended or adjusted under 35 U.S.C. 154(b) by 0 days.

(21) Appl. No.: 18/684,678

(22) PCT Filed: Nov. 6, 2022

(86) PCT No.: PCT/JO2022/050018
§ 371 (c)(1),
(2) Date: Feb. 18, 2024

(87) PCT Pub. No.: WO2023/084556
PCT Pub. Date: May 19, 2023

(65) Prior Publication Data
US 2024/0282186 A1 Aug. 22, 2024

(30) Foreign Application Priority Data
Nov. 10, 2021 (JO) .................................... 0303/2021

(51) Int. Cl.
*G08B 21/02* (2006.01)
*A42B 3/04* (2006.01)
*G08B 21/04* (2006.01)
*G08B 25/00* (2006.01)
*G08B 27/00* (2006.01)

(52) U.S. Cl.
CPC .............. *G08B 21/02* (2013.01); *A42B 3/046* (2013.01); *G08B 21/043* (2013.01); *G08B 21/0453* (2013.01); *G08B 25/009* (2013.01); *G08B 27/001* (2013.01)

(58) Field of Classification Search
CPC .... G08B 21/02; G08B 27/001; G08B 21/043; G08B 21/0446; G08B 21/0453; G08B 25/009; G08B 25/016; A42B 3/046
See application file for complete search history.

(56) References Cited

U.S. PATENT DOCUMENTS 6,798,392 B2 * 9/2004 Hartwell ................ A42B 3/046 345/158
10,217,345 B1 * 2/2019 Nanjappan ............. G08B 21/18
10,229,581 B1 * 3/2019 Bender ................. H04W 4/022
2012/0191397 A1 * 7/2012 Eatwell ................ A61B 5/6803 73/1.79

(Continued)

FOREIGN PATENT DOCUMENTS

WO WO-2018094520 A1 * 5/2018 ............. G01S 19/17

*Primary Examiner* — John A Tweel, Jr.
(74) *Attorney, Agent, or Firm* — Oblon, McClelland, Maier & Neustadt, L.L.P.

(57) ABSTRACT

A real-time safety monitoring system including a hardware part having a helmet with a plurality of sensors configured to measure vital data of a worker who is wearing the helmet; networks, including a long range network and a short range network, configured to transmit the vital data throughout the system; and a processing, controlling, and display part including a cloud storage and a safety dashboard configured to receive, analyze, and display the vital data after analysis. A productivity level of the worker can be estimated using the measured vital data. A method of health management may use the real-time safety monitoring system.

20 Claims, 10 Drawing Sheets

(56) References Cited

U.S. PATENT DOCUMENTS

| | | | | |
|---|---|---|---|---|
| 2016/0106174 | A1* | 4/2016 | Chung | A42B 3/0433 340/539.13 |
| 2017/0309152 | A1* | 10/2017 | Dinkins | G08B 21/043 |
| 2018/0258882 | A1* | 9/2018 | Thiel | H01M 50/24 |
| 2021/0186342 | A1* | 6/2021 | Bogdanovich | A61B 5/0022 |
| 2021/0386154 | A1* | 12/2021 | Baker | A42B 3/046 |
| 2022/0284369 | A1* | 9/2022 | Woodhead | G06Q 10/06395 |

* cited by examiner

REAL-TIME SAFETY MANAGEMENT SYSTEM AND METHOD

CROSS-REFERENCE TO RELATED APPLICATIONS

The present application is the national stage of international application PCT/J02022/050018, filed on Nov. 6, 2022, and claims the benefit of the filing date of Jordanian Appl. No. 0303/2021, filed on Nov. 10, 2021.

TECHNICAL FIELD

The present disclosure generally relates to safety management systems and methods, and more particularly to a real-time system and method for monitoring safety of workers and tracking the status of workplace equipment through utilizing artificial intelligence ("AI"), machine learning, and different types of communication networks.

BACKGROUND

Many workers are potentially exposed to severe injuries when working in hazardous environments such as the construction sites, industrial environments, and oil and gas extraction fields. In most cases, the reason for such injuries is either the lack of workers' health status tracking, or doing tasks that they are not qualified for.

In order to potentially lower the chances of injuries due to lack of health status tracking, different attempts in the prior art were made to provide safety management systems and methods. For instance, the U.S. patent application published under number US20210337355 discloses a system and method of using a personal area network, the system includes a wearable electronic device configured to collect data received from one or more sensors located within wireless signal range of the personal area network, and to send collected data over a wireless low power wide area network to remote locations, wherein the locations are within a large network for subsequent processing, user notification, and location analysis and determination.

The U.S. patent application published under number US20210005072 discloses a smart safety system and method, the system includes a plurality of wearable safety devices including a head-protection, gloves, and earbuds. The system and method provides data packages that are available in real-time for a cloud/SAT database/software application, user interface dashboard, or other software applications including a web-based platform for records keeping, charting, and measuring including but not limited to the personal bio-marks of the system's wearer, the head-protection of the system comprising a suspension, a plurality of sensors provided within the suspension, a wireless data communication device, a wireless audio communication device, a GPS antenna(s), and a self-illuminating light-emitting diode.

The U.S. patent application published under number US20210030097 discloses a helmet including impact and health data system, the helmet is configured to include an outer shell, an inner liner positioned inside the outer shell, a data collection assembly that includes a first data collection member for measuring impact data, and a second data collection member for measuring vital signs data. The helmet may further include a cloud-based computer, tablet and mobile phone-enabled vitals monitoring system. Additionally, the helmet may include sensors configured to detect events and measure biometric data.

The U.S. patent application published under US20170270761 discloses a computerized safety tracking and proximity warning system and method comprising a computer configured to receive wireless position information from transponders worn by personnel and affixed to plant or equipment via one or more wireless communication protocols to provide a seamless visual display of relative positions of personnel, plant or equipment whether above or below ground level or moving there between, wherein an alarm is triggered to alert an operator if the locations of the personnel and plant or equipment are within a predetermined and unsafe distance of each other.

SUMMARY

It is an object of the present disclosure to develop a real-time safety monitoring system that may include a hardware part having a helmet with a plurality of sensors configured to measure vital data of a worker who is wearing the helmet; networks including a long range network and a short range network, the networks may be configured to transmit the vital data throughout the system components; and a processing, controlling, and display part including a cloud storage and a safety dashboard, that may be configured to receive, analyze, and display the vital data after analysis, wherein a productivity level of the worker may be estimated using the measured vital data.

In some aspects of the present disclosure, the hardware part may further include a communication device configured to enable the worker to write and send messages; and a central server configured to receive the vital data and the messages from the short range network.

In some aspects, the long range network may be configured to transmit the vital data along long distances in open spaces.

In some aspects, the short range network may be configured to transmit the vital data along short distances in closed spaces.

In some aspects, the networks may further include transmission equipment that may include a group of antennas in open spaces for the long range network and a group of beacons in closed spaces for the short range network; and an internet connection that may be configured to transmit the vital data from the central server to the processing, controlling, and display part.

In some aspects, the internet connection may be achieved through a cellular, a satellite global system for mobile network, a wireless local area network, or a local area network.

In some aspects of the present disclosure, the cloud storage may include a workforce module configured to analyze and report the vital data; a training module configured to record and track all training courses for the worker; and an assets module configured to track the location and status of workplace equipment and ensure that the workplace equipment is safely operated by trained or authorized workers.

In some aspects, the cloud storage may further include a Geofence module configured to identify a frame of a workplace and detect unauthorized entries to the workplace; a reporting module configured to report safety incidents on the safety dashboard; and an Artificial Intelligence "AI" and Machine Learning "ML" module (307) that may be configured to predict any safety incident based on the vital data after analysis.

In some aspects of the present disclosure, the helmet may further include a cable and a connector plugged into a port in order to connect the sensors with an electronic processing unit; an emergency button configured to be used when the worker is in an emergency situation and needs an urgent support; and a location sensor configured to communicate with a plurality of systems for determining a location of the helmet.

In some aspects, the plurality of systems may be a Real Location Time System "RLTS" configured to determine the location of the helmet inside closed places, and a Global Positioning System "GPS" configured to determine the location of the helmet in open places.

In some aspects, the electronic processing unit may be configured to receive more than one reading of each parameter of the vital data with different levels of confidence from the sensors, select a reading with highest level of confidence to be sent, and regulate a frequency of measurements process.

In some aspects, the helmet may further include a power unit configured to power the sensors, and an embedded antenna configured to send the vital data from the helmet.

In some aspects, the power unit may include a rechargeable battery configured to store electric energy needed to operate each helmet; a thin film photovoltaic panel shielding the helmet configured to charge the rechargeable battery; a charging port configured to conventionally charge the rechargeable battery; an electric converter configured to convert AC power to DC power in case of charging the rechargeable battery conventionally; and a blocking diode configured to protect the thin film photovoltaic panel from any electric current back flow.

In some aspects, the helmet may further include a vibrator and a speaker configured to alarm the worker in an emergency case.

In some aspects, the helmet may further include a microphone configured to enable the worker to send voice messages to the processing, controlling, and display part through the networks that are in connection with the helmet.

In some aspects of the present disclosure, the sensors may include a temperature sensor configured to measure the worker's temperature; a piezoelectric sensor configured to detect motion parameters of the worker; Electrodermal sensors configured to measure the Electrodermal activity of the worker; and Photoplethysmography sensors configured to measure a heart rate, an inter beat interval, a blood oxygen saturation and a blood pressure of each worker.

It is an object of the present disclosure to provide a method of safety management using the system of the present disclosure, that may include the following steps:

- deploying and installing the hardware part, the networks, and the processing, controlling and display part;
- gathering the vital data by the plurality of sensors with different levels of confidence for a worker wearing the helmet;
- filtering the vital data and choosing the vital data having the highest level of confidence by the electronic processing unit;
- receiving messages sent from the communication device and the microphone by the electronic processing unit;
- determining a location of the worker using one or more conventional positioning systems and the location sensor added to the helmet;
- transmitting the filtered and chosen vital data and messages by the group of antennas through the long range network in open spaces and by the group of beacons through the short range network in closed spaces until the filtered and chosen vital data and messages reach to the central server;
- transmitting the vital data and messages received the central server through though the internet connection to the cloud storage;
- analyzing the received vital data and messages by the cloud storage modules; the workforce module, the training module, the assets module, the Geofence module, the reporting module, and the Artificial Intelligence "AI" and Machine Learning "ML" module; and
- displaying the vital data and messages after Analysis on the safety dashboard.

BRIEF DESCRIPTION OF DRAWINGS

The disclosure will now be described with reference to the accompanying drawings, which illustrate embodiments of the present disclosure without limiting the scope thereto, and in which.

DETAILED DESCRIPTION

Figure 1:
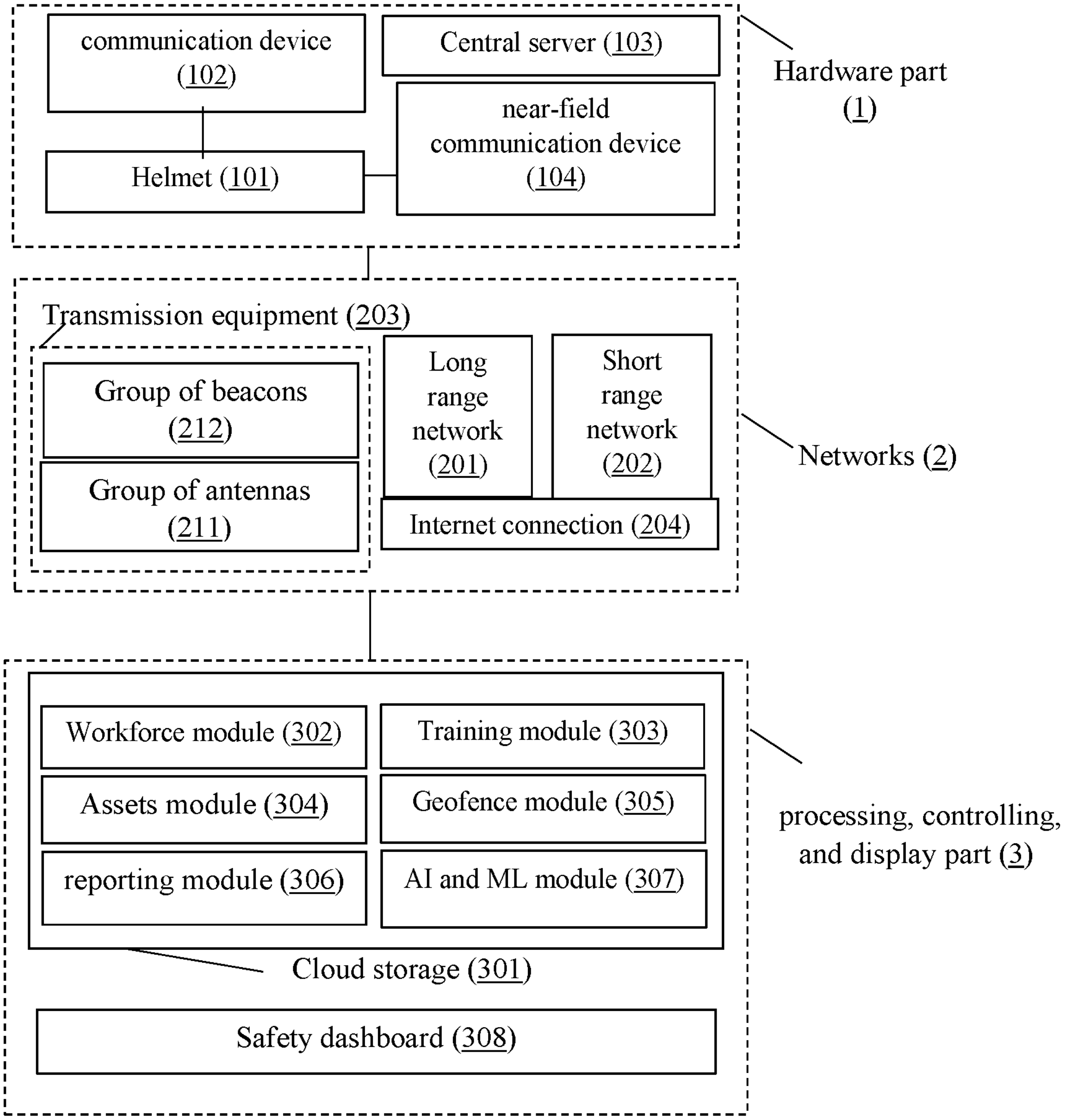
FIG. 1 illustrates a schematic diagram of a real-time safety management system configured in accordance with embodiments of the present disclosure.

FIGS. 1-4, 6, 8 illustrate a real-time safety management system capable of monitoring status and managing workers in both closed and open spaces, the system is being configured according to embodiments of the present disclosure. Reference is now being made to FIG. 1, which illustrates a schematic diagram of the system of the present disclosure. In embodiments of the present disclosure, the system may include a hardware part 1, wherein the hardware part 1 may include a plurality of helmets 101, each of the plurality of helmets 101 is configured to be worn by a worker, and each helmet 101 has a plurality of sensors 111 that may be configured to measure vital data of the plurality of workers wearing the plurality of helmets 101; networks 2 including a long range network 201 and a short range network 202, wherein the networks 2 may be configured to transmit the vital data measured by the plurality of sensors 111 throughout the system; and a processing, controlling, and display part 3 configured to receive, analyze, and display the vital data after analysis, wherein a productivity level of each of the plurality of workers is estimated using the measured vital data.

In some embodiments of the present disclosure, the hardware part 1 may further include a communication device 102 configured to enable the worker to write and send messages to the processing, controlling, and display part 3 through the networks 2 that are in connection with the helmets 101.

In some embodiments, the hardware part 1 may further include a central server 103 located in a headquarter or a remote management location, the central server 103 is configured to receive the vital data and the messages through the networks 2.

In some embodiments, the hardware part 1 may further include a near-field communication ("NFC") device 104 configured to transmit a location and a status of a workplace equipment connected to the near-field communication ("NFC") device 104 to the closest helmet 101, i.e. the helmet that has the shortest distance to the NFC device 104.

In some embodiments, the long range network 201 may be configured to transmit the vital data and messages along long distances in open spaces.

In some embodiments, the short range network 202 may be configured to transmit the vital data and messages along short distances in closed spaces.

In some embodiments, the networks 2 act as an interconnection between the hardware part 1 and the processing, controlling, and display part 3, wherein the networks 2 may include transmission equipment 203 including a group of antennas 211 for the long range network 201 distributed in open spaces and a group of beacons 212 for the short range network 202 distributed in closed spaces; and an internet connection 204 that may be configured to transmit the vital data from the central server 103 to the processing, controlling, and display part 3.

In some embodiments, the group of antennas may be powered by one or more photovoltaic panels integrated to each of the antennas 211.

In some embodiments, the internet connection 204 may be achieved through a cellular network, a satellite network, a wireless local area network ("WLAN"), a local area network ("LAN"), or combinations thereof.

In some embodiments of the present disclosure, the processing, controlling, and display part 3 may include a cloud storage 301 configured to receive, store and analyze the vital data received from networks 2; and a safety dashboard 308 that may be configured to display the vital data after analysis.

In some embodiments, the cloud storage 301 may include a workforce module 302 configured to analyze and report the vital data.

In some embodiments, the workforce module 302 may include information of the worker such as, but not limited to, contact details, age, height, weight, medical history and conditions, position, and years of experience, which are linked for the vital data of the worker.

In some embodiments, the cloud storage 301 may further include a training module 303 that is configured to record and track all training courses of the worker.

In some embodiments, the training module 303 may include information about completed, scheduled, and pending courses, which may be reported on the safety dashboard 308.

In some embodiments, the cloud storage 301 may further include an assets module 304 that may be configured to track the location and status of workplace equipment and ensure that the workplace equipment is safely operated by a trained or an authorized worker.

In some embodiments, the cloud storage 301 may further include a Geofence module 305 configured to identify a frame of a workplace and detect unauthorized entries to the workplace.

In some embodiments, the cloud storage 301 may further include a reporting module 306 that may be configured to report safety incidents and mitigate repetition of occurred incidents.

In some embodiments, the cloud storage 301 may further include an Artificial Intelligence ("AI") and Machine Learning ("ML") module 307 that may be configured to predict any safety incident based on the vital data after analysis.

Figure 2:
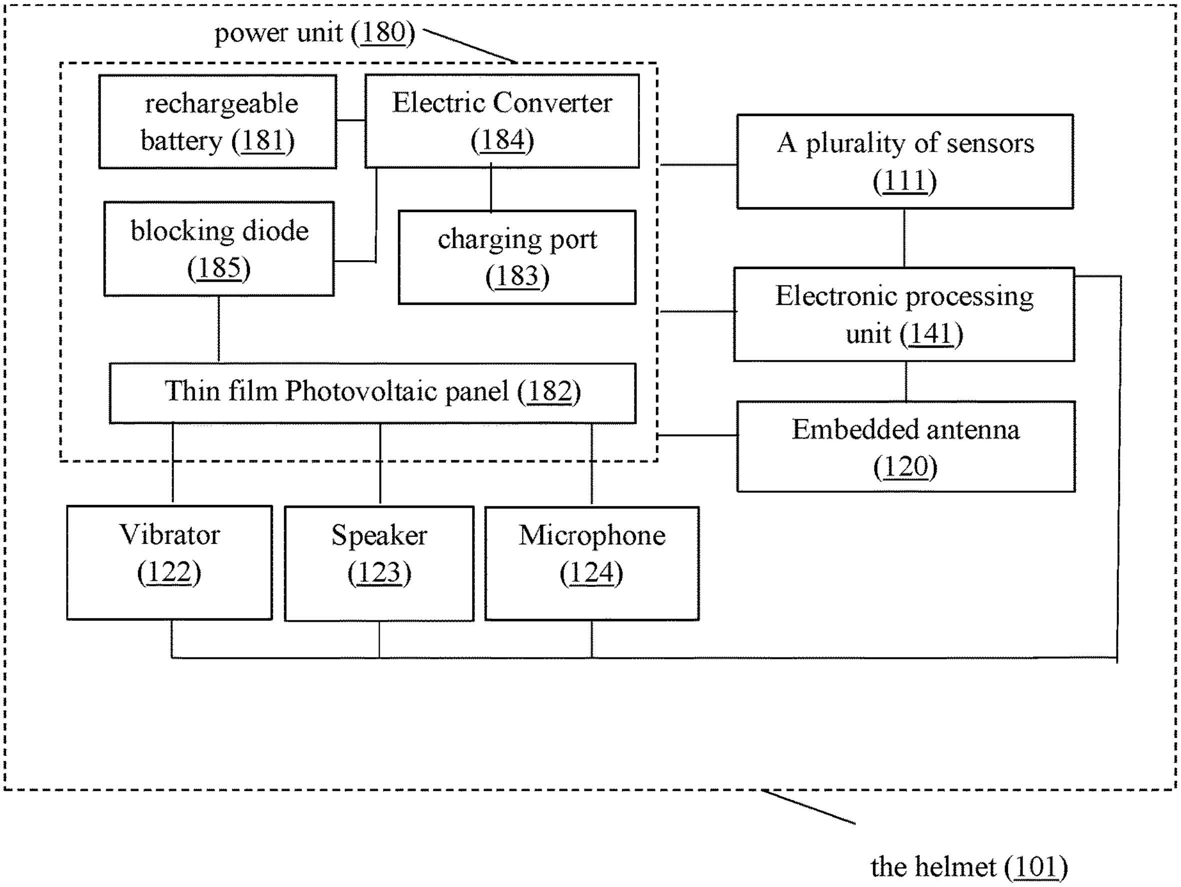
FIG. 2 illustrates a schematic diagram a helmet of the real-time safety management system configured in accordance with embodiments of the present disclosure.
Figure 3A:
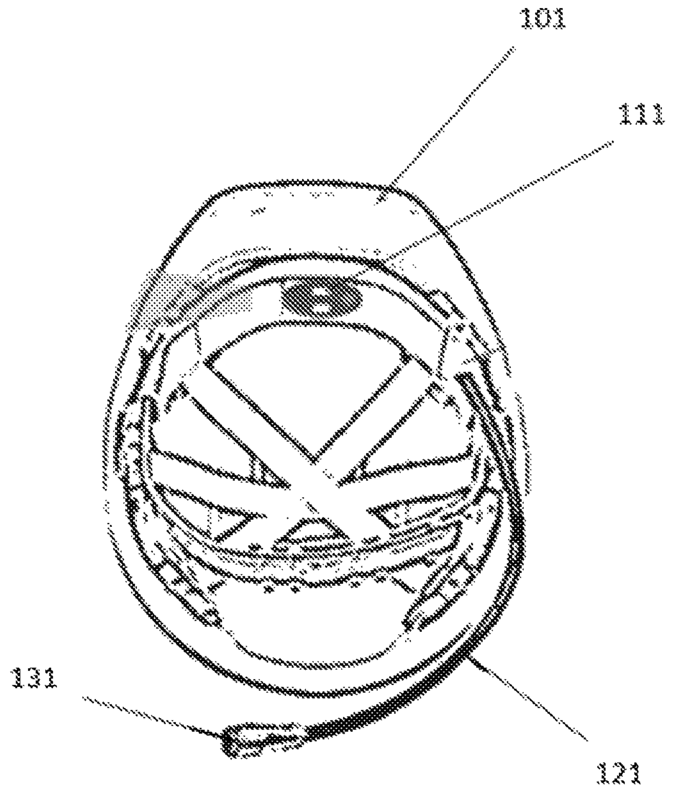
FIG. 3A illustrates a bottom view of the helmet of the real-time safety management system configured in accordance with embodiments of the present disclosure.
Figure 3B:
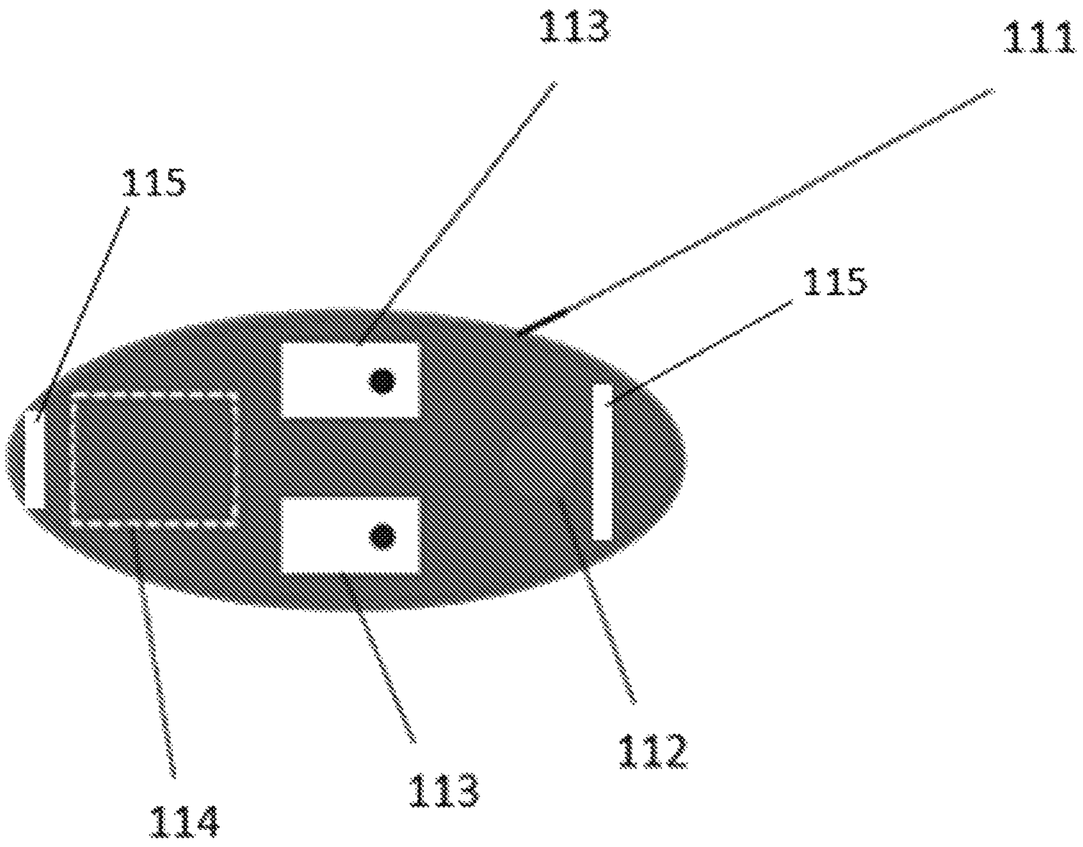
FIG. 3B illustrates a schematic diagram of a plurality of sensors of the helmet of the real-time safety management system configured in accordance with embodiments of the present disclosure.
Figure 4:
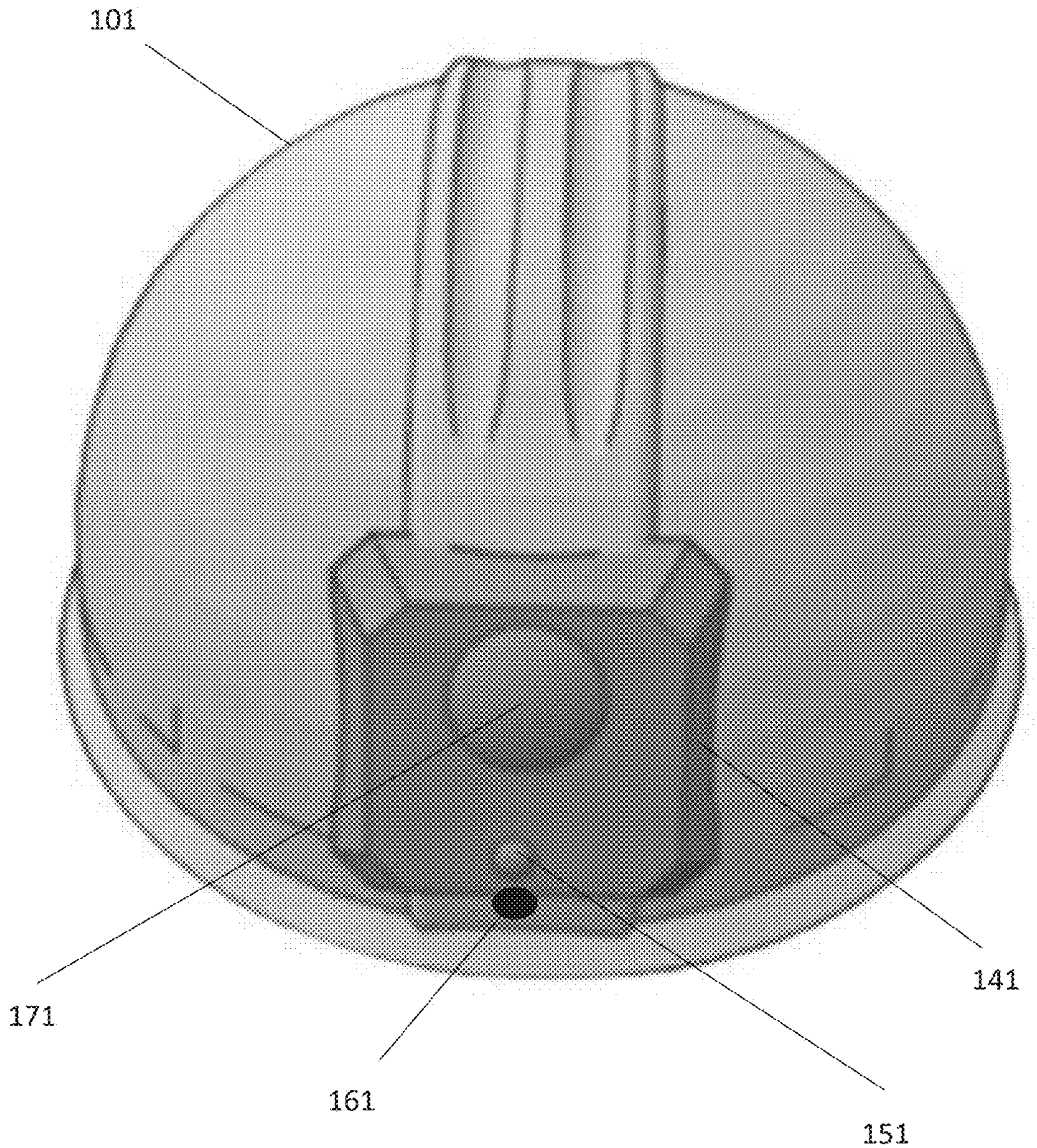
FIG. 4 illustrates a rear perspective view of the helmet of the real-time safety management system configured in accordance with embodiments of the present disclosure.

Reference is being now made to FIGS. 2-4, which illustrate the helmets 101 of the real time safety management system configured according to embodiments of the present disclosure. As illustrated, each of the helmets 101 may further include a power unit 180 configured to power the plurality of sensors 111, an electronic processing unit 141, a vibrator 122, a speaker 123, a microphone 124, and an embedded antenna 120 configured to send the vital data from the helmet 101.

In some embodiments, the power unit 180 may include a rechargeable battery 181 configured to store electric energy needed to operate the helmet 101; a thin film photovoltaic panel 182 shielding the helmet 101, such panel 182 may be configured to charge the rechargeable battery 181; a charging port 183 configured to conventionally charge the rechargeable battery 181; an electric converter 184 configured to convert AC power to DC power in case of charging the rechargeable battery conventionally; and a blocking diode 185 configured to protect the thin film photovoltaic panel 182 from any electric current back flow.

In some embodiments, the helmet 101 may further include a cable 121 and a connector 131 plugged into a port 161 in order to connect the plurality of sensors 111 with the electronic processing unit 141; an emergency button 171 configured to be used when the worker is in an emergency situation and needs urgent support; and a location sensor 151 that is configured to communicate with one or more conventional positioning systems for determining a location of the helmet 101.

In some embodiments, the electronic processing unit 141 may be configured to receive more than one reading of each parameter of the vital data with different levels of confidence from the plurality of sensors 111, select the reading with highest level of confidence to be sent, and regulate a frequency of measurements process.

In some embodiments, the vibrator 122 and the speaker 123 may be configured to notify the worker in emergency cases, wherein the emergency cases may include the necessity to evacuate a dangerous area such as in the event of or fire.

In some embodiments, the microphone 124 may be configured to enable the worker to send voice messages from the helmet 101 to the processing, controlling, and display part 3 through the networks 2.

In some embodiments, the voice messages may be recorded using a button (not shown) in the helmet 101.

In some embodiments, the one or more conventional positioning systems, with which the location sensor 151 of the helmet 101 communicates, may be a real location time system ("RLTS") configured to determine the location of the helmet 101 inside closed places, and a global positioning system ("GPS") configured to determine the location of the helmet 101 in open places.

In some embodiments, the plurality of sensors 111 may include a temperature sensor 112 configured to measure the worker's body temperature; a piezoelectric sensor 114 configured to detect the worker's motion; electrodermal sensors 115 configured to measure the electrodermal activity ("EDA") of the worker; and photoplethysmography sensors 113 configured to measure heart rate, inter beat interval, blood oxygen saturation and blood pressure of the worker.

In some embodiments of the present disclosure, the productivity level of the worker may be determined by means of calculating the calories that worker burned per hour. The calories burned per hour may be calculated using the heart rate of the worker.

In some embodiments, the burnt calories may be calculated for male worker using the following equation:

$$\text{Calories}_{burned} = \frac{60T}{4.184}(0.6309HR + 0.1988W + 0.2017A - 55.0969)$$

Wherein, HR indicates the worker's heart rate, W indicates the worker's mass in kilogram, A indicates the worker's age in years, and T indicates the working duration in hours.

In some embodiments, the burnt calories may be calculated for female worker using the following equation:

$$\text{Calories}_{burned} = \frac{60T}{4.184}(0.4472HR + 0.1263W + 0.074A - 20.4022)$$

Wherein, HR indicates the worker's heart rate, W indicates the worker's mass in kilogram, A indicates the worker's age in years, and T indicates the working duration in hours.

Figure 5A:
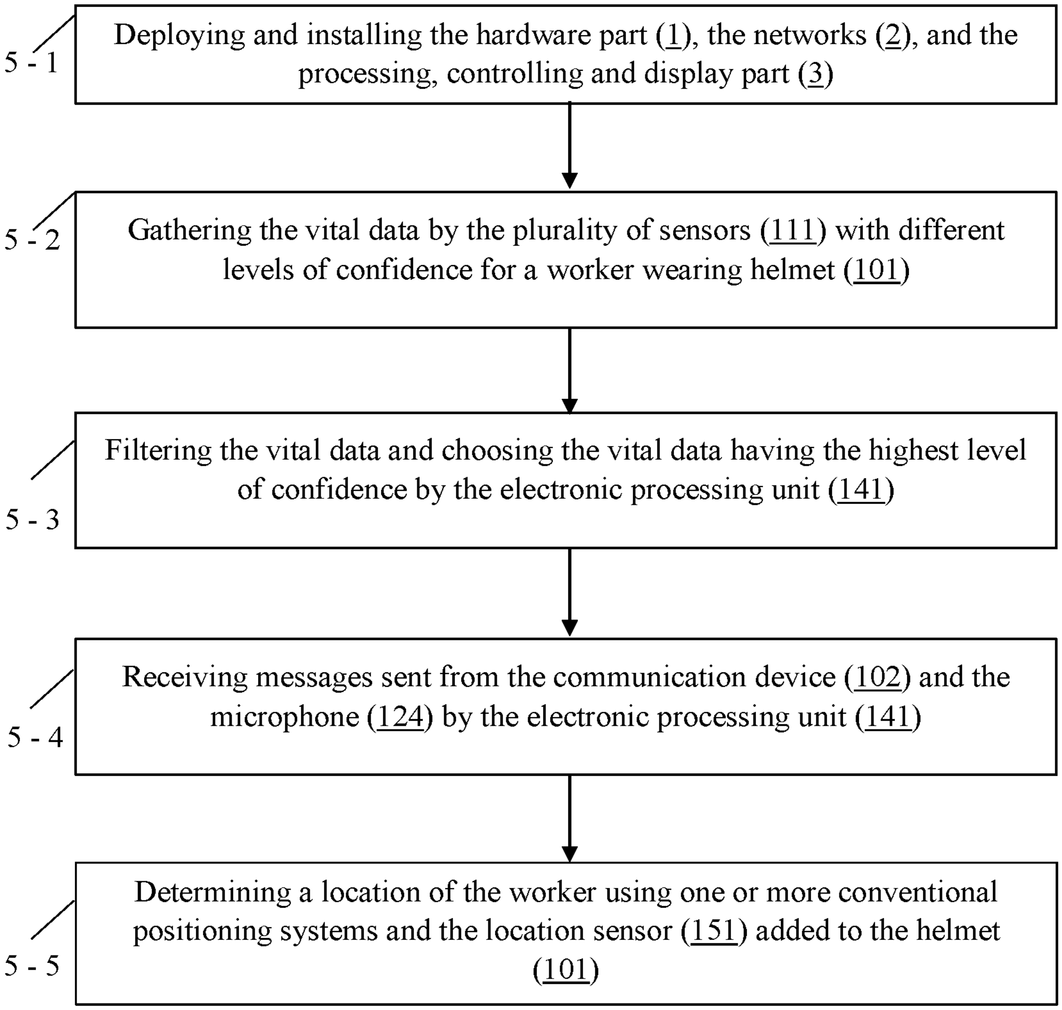
FIG. 5A illustrates a flowchart of a method of real-time safety management using the real-time safety management system, the system and method being configured in accordance with embodiments of the present disclosure.
Figure 5B:
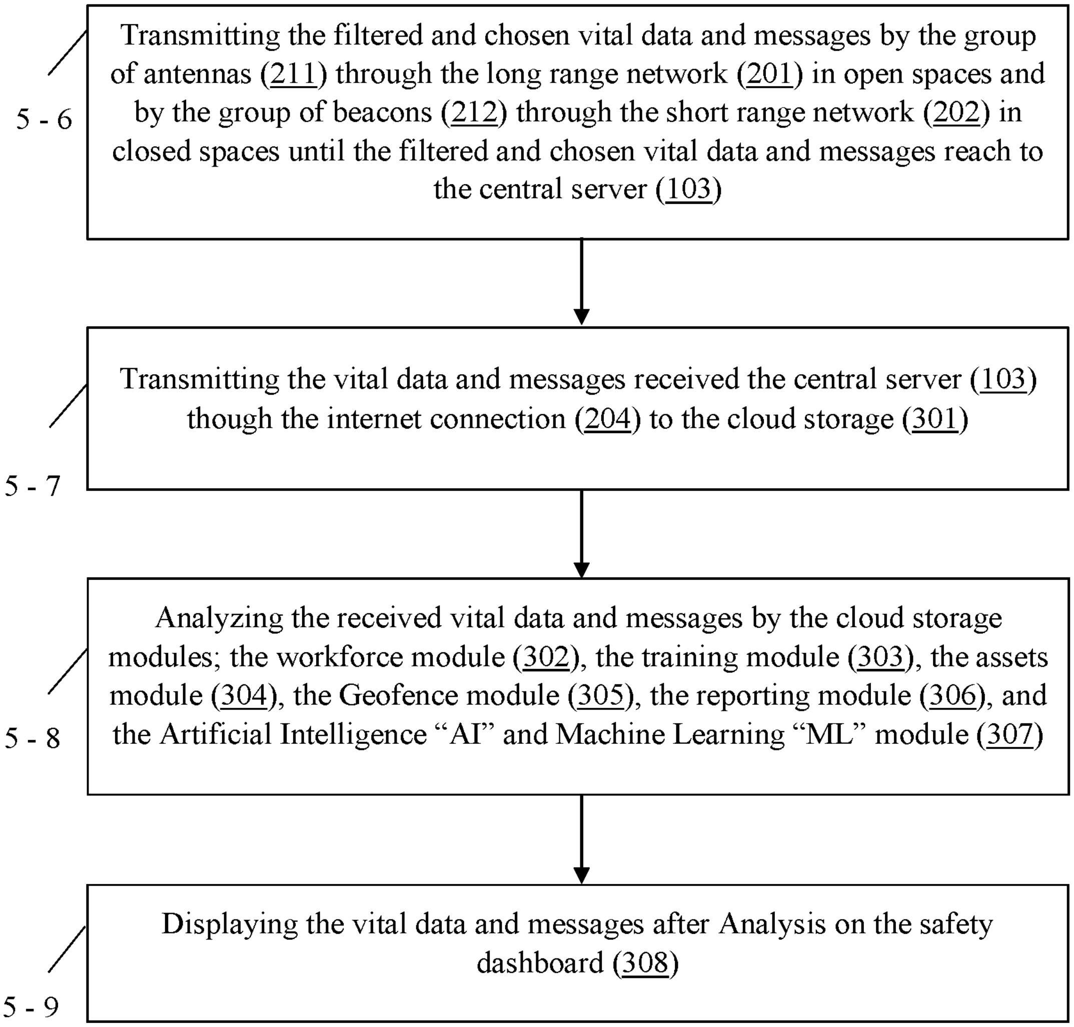
FIG. 5B illustrates a complement of the flowchart of a method of real-time safety management using the real-time safety management system, the system and method being configured in accordance with embodiments of the present disclosure.
Figure 6:
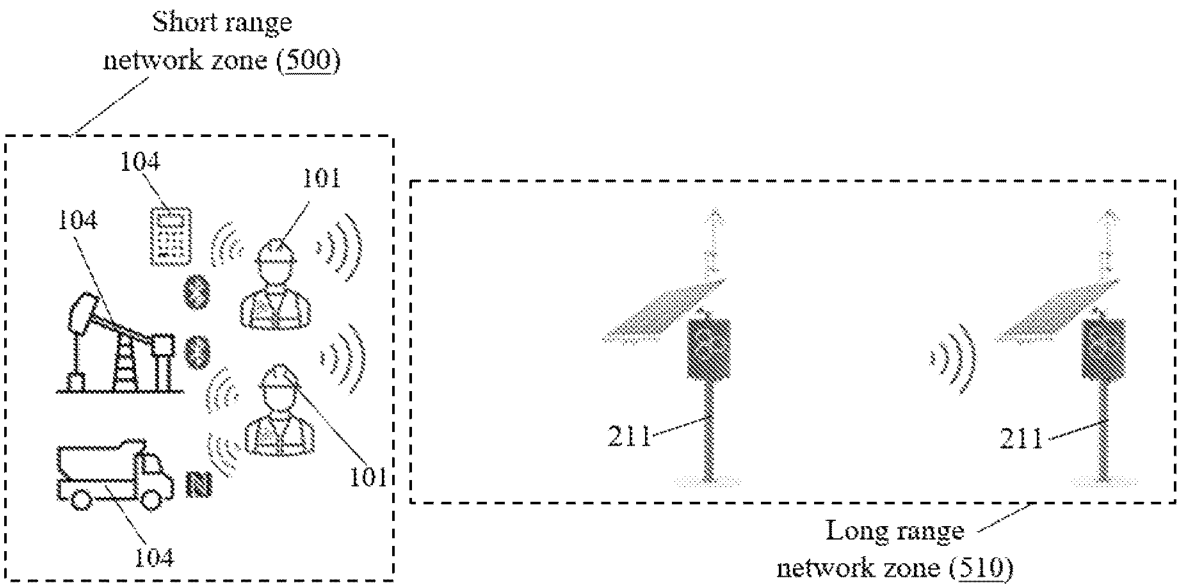
FIG. 6 illustrates a schematic diagram of network zones of the real-time safety management system configured in accordance with embodiments of the present disclosure.

Reference is being now made to FIG. 5 A and FIG. 5 B with continued reference to FIGS. 1-4. FIGS. 5A, 5B illustrate a flowchart of a method of safety management using the system described in this disclosure. The method may include the steps of:

- Deploying and installing the hardware part 1, the networks 2, and the processing, controlling and display part 3 (process block 5-1);
- Gathering the vital data, by the plurality of sensors 111, with different levels of confidence for a worker wearing the helmet 101 (process block 5-2);
- Filtering the vital data and choosing the vital data having the highest level of confidence by the electronic processing unit 141 (process block 5-3);
- Receiving messages sent from the communication device 102 by the electronic processing unit 141 (process block 5-4);
- Determining the location of the worker using one or more conventional positioning systems and the location sensor 151 added to the helmet 101 (process block 5-5);
- Transmitting the filtered and chosen vital data and messages by the group of antennas 211 through the long range network 201 in open spaces and by the group of beacons 212 through the short range network 202 in closed spaces until the filtered and chosen vital data and messages reach the central server 103 (process block 5-6);
- Transmitting the vital data and messages received the central server 103 though the internet connection 204 to the cloud storage 301 (process block 5-7);
- Analyzing the received vital data and messages by the cloud storage modules; the workforce module 302, the training module 303, the assets module 304, the Geofence module 305, the reporting module 306, and the AI and ML module 307 (process block 5-8); and Displaying the vital data and messages after Analysis on the safety dashboard 308 (process block 5-9). Reference is being now made to FIG. 6, which illustrates a short range network zone 500, wherein the near-field communication device 104 connecting to each of the workplace equipment may transmit data to the closest helmet 101, the data may include a location and a status for each of the workplace equipment, and a long range network zone 510, wherein the data may be transmitted for the closest helmet 101 to the assets module 304 by means of the group of antennas 211.

Figure 7:
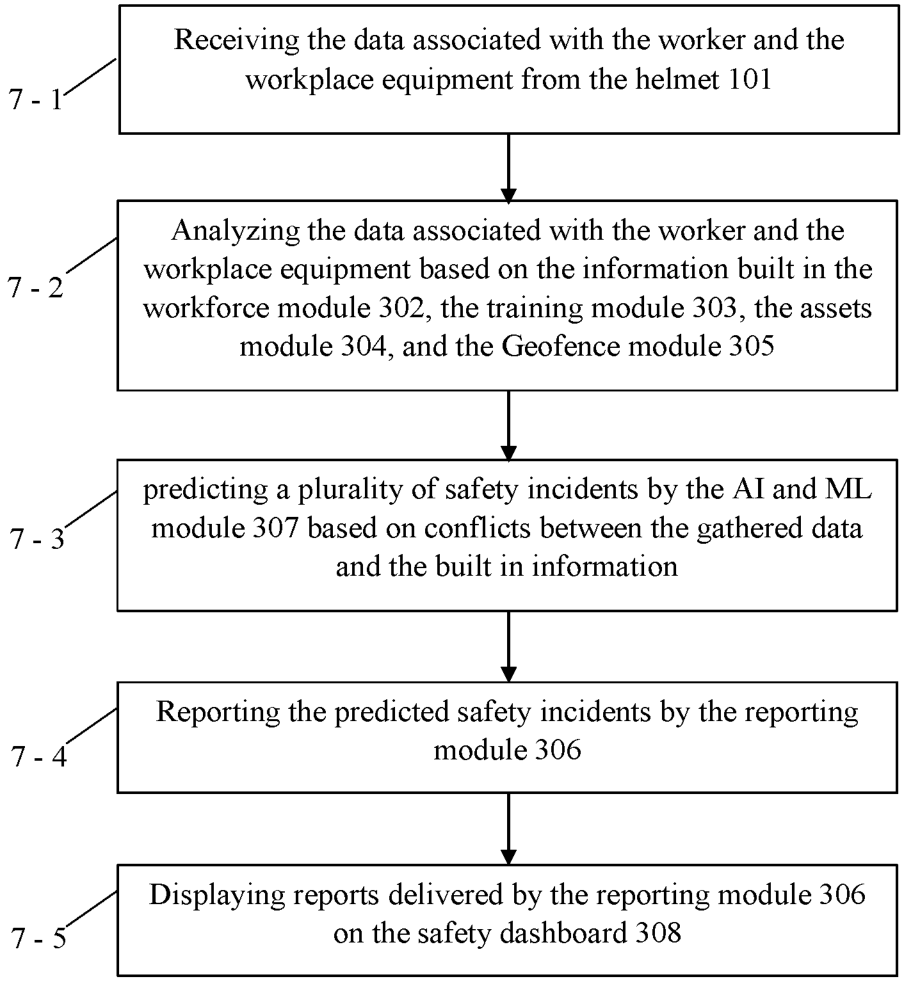
FIG. 7 illustrates a flow chart of data transmission between the processing modules of the real-time safety management system configured in accordance with embodiments of the present disclosure.

Reference is being now made to FIG. 7 which illustrates a flow chart of a method of processing the data in the different modules of the cloud storage before get displayed on the safety dashboard, the method may comprise the following steps:

- receiving the data associated with the worker and the workplace equipment from the helmet 101 (process block 7-1);
- analyzing the data associated with the worker and the workplace equipment based on the information built in the workforce module 302, the training module 303, the assets module 304, and the Geofence module 305 (process block 7-2);
- predicting a plurality of safety incidents by the AI and ML module 307 based on conflicts between the gathered data and the built in information (process block 7-3);
- reporting the predicted safety incidents by the reporting module 306 (process block 7-4); and
- displaying reports delivered by the reporting module 306 on the safety dashboard 308 (process block 7-5).

Figure 8:
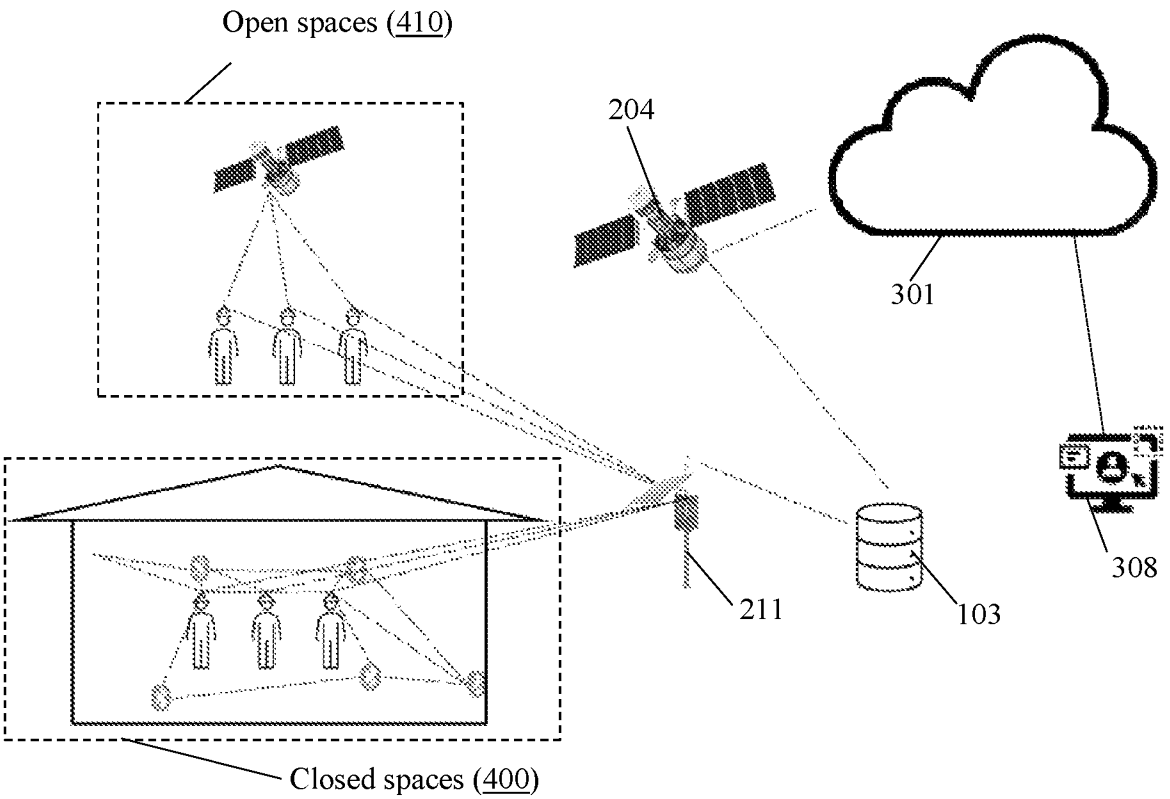
FIG. 8 illustrates a schematic diagram showing open and closed spaces of the real-time safety management system configured in accordance with embodiments of the present disclosure.

Reference is being now made to FIG. 8 which illustrates a schematic diagram of closed spaces 400, wherein the data transmitted through the short range network 202 using a group of beacons 212 (not shown) or NFC devices, and open spaces 410, wherein the data transmitted through the long range network 201 using a group of antennas 211.

Example (1)

Detection Some of Clinical Indicators

The real-time safety management system of the present disclosure could be a diagnostic tool that can detect a plurality of clinical indicators that may happen for the worker in the workplace.

The clinical indicators may be detected by means of some abnormal readings for specific vital data of the worker received by the cloud storage 301.

The abnormality of the received vital data may be determined by comparing them with the information built in the workforce module 302.

The built in information may comprise a health history for the worker in addition to the normal ranges of the vital readings which may depend upon the worker's age, gender, weight, and height.

The AI and ML module 307 may predict a plurality of clinical indicators based on a plurality of abnormal readings for the worker's vital data.

The predicted clinical indicators may be reported by the reporting module 306 to be displayed on the safety dashboard 308.

Table (1) illustrates the predicted clinical indicators corresponding to the abnormal readings of the worker's vital data.

TABLE 1 the clinical indicators of abnormal readings of the worker's vital data.

| | | Clinical indicators | | | | | | | | | | | |
|---|---|---|---|---|---|---|---|---|---|---|---|---|---|
| | | Heat stroke | Tachy-cardia | Brady-cardia | Atrial Fibrillation | Heat attack | Ischemic stroke | Dysphagia | Hypoxemia | Infection | Stress | Anxiety | Seizure |
| Vital data | Temperature | ● | | | | | | | | ● | | | |
| | Heart rate | | ● | ● | | ● | ● | | ● | | ● | ● | ● |
| | Inter beat interval | | | | ● | ● | ● | | | | | | |
| | Blood oxygen saturation | | | | | | ● | ● | ● | | ● | | |
| | Blood pressure | | ● | ● | | ● | ● | | | | | | |
| | Electrodermal | ● | | | | | | | | | ● | ● | ● |
| | motion | | | | | | | ● | | ● | | | ● |

Example (2)

Discovery of a Gas Leakage in the Project of Oil and Gas Pipeline

The real-time safety management system of the present disclosure could be used in a working environment, wherein 500 workers are working on repairing an oil and gas pipeline extending over a length of 100 km, that couldn't be covered using GSM.

The vital data was captured every minute from the helmets 101 worn by the workers and was transmitted through the long range network 201 by means of three solar powered antennas 203 distributed over the working environment. Also, the helmets 101 were connected to a single GSM through these antennas.

A safety officer located in a headquarter of the company who is in charge of monitoring the safety dashboard in the repairing of the oil and gas pipeline, may communicate with the workers' supervisor.

The safety officer noticed through the safety dashboard 308 that 25 workers working in a specific area on the pipeline have a significant lower blood oxygen saturation SpO2 levels than the normal range. Furthermore, he noticed that the reporting module 306 recorded two cases of fainting in the workers there.

The safety dashboard 308 displayed that the workers' temperatures are within the normal range. However, the workers' heart rate is slightly lower than the normal range.

The safety officer sent a warning message to the project supervisor on the site through the communication devices 102 to check the area where the workers located.

The project supervisor discovered a major leak that decreases the amount of oxygen near the pipeline where the workers are suffering from low blood oxygen saturation levels SpO2.

The project manager distributes oxygen cylinders to the workers to safely complete the repairing of the pipeline in the area where the major leak was located.

Example (3)

Detection of the Workers Suffering from the COVID-19 Symptoms

The real time safety management system of the present disclosure was also tested in a working environment, wherein about 700 workers were working on a 10-story building construction project with area of 2 million square meters.

The vital data captured from the helmets 101 worn by the workers was transmitted through the short range network 202 by means of 50 low energy Bluetooth beacons 203 that were distributed over the construction site of the 10-story building, as well as the long range network 201 by means of one antenna 203 to the headquarter where the central server 103 was located.

A safety officer was located in a headquarter of the company, who was in charge of the monitoring the work flow in the construction site, where the central server 103 located. The safety officer has an internet connection in his office. The safety officer noticed through the safety dashboard 308 of the processing, controlling, and display part 3, that seven workers installing mechanical equipment on the 2$^{nd}$ floor of in a specific section of the building have reported a slight increase in their temperature over a period of two days as well as an increase in the number of coughs and sneezes which were detected through the piezoelectric sensor in the helmet.

The safety officer informed the project manager about the seven workers having high temperature and an increase rate of coughs and sneezes in order to send them to the clinic for a wellness check-up.

The workers were tested for COVID-19, and the result for the seven workers was positive.

The safety officer requested for the wellness check-up of the all worker in the 2$^{nd}$ floor as well as any worker who was in close contact with the seven workers in the past two days, which are determined by the real time safety management system.

For the sake of simplicity, the description, claims and drawings of the present disclosure are being made with reference to one worker who wears one helmet 101, has one communication device 102, and one near-field communication device 104. It should be appreciated that there would be a plurality of workers using the system of the present disclosure in the same location.

In embodiments of the present disclosure, the long distances term may be defined as the distances in which the signals transmitted by low frequency such as 2.4 GHz which is slowly attenuated by the distance length.

In embodiments of the present disclosure, the short distances term may be defined as the distances in which the signals transmitted by high frequency such as 4 or 5 GHz which are rapidly attenuated by the distance length.

In embodiments of the present disclosure, the open spaces term may be defined as the spaces outdoors where the signals are not attenuated by the walls, signals and constructed items.

In embodiments of the present disclosure, the closed spaces term may be defined as the space indoors where the signals are attenuated by the walls, ceilings and constructed items.

In embodiments of the present disclosure, the normal range term may be defined as the range wherein the vital data of the worker do not indicate any clinical indicator.

While embodiments of the present disclosure have been described in detail and with reference to specific embodiments thereof, it will apparent to one skilled in the art that various additions, omissions, and modifications can be made without departing from the spirit and scope thereof.

What is claimed is:

1. A real-time safety monitoring system, comprising:
- a hardware part comprising a helmet, the helmet comprising a plurality of sensors configured to measure vital data of a worker wearing the helmets, the sensors being arranged as an add-on component for a standard helmet, mounted on a forehead region of the helmet;
- networks, comprising a long range network and a short range network, configured to transmit the vital data throughout the system
- an electronic processing and communication unit, configured to receive signals from the plurality of sensors, located outside the helmet; and
- a processing, controlling, and display part comprising a cloud storage and a safety dashboard configured to receive, analyze, and display the vital data after analysis,
- wherein the system is configured to estimate a productivity level of the worker using the measured vital data,
- wherein the plurality of sensors are forehead-mounted and arranged such that the sensors contact forehead skin,
- wherein the plurality of sensors comprise a temperature sensor, a photoplethysmography sensor, and an electrodermal sensor,
- wherein the electrodermal sensor is configured to measure electrodermal activity of the worker,
- wherein the temperature sensor is configured to measure a temperature of the worker, and
- wherein the photoplethysmography sensor is configured to measure a heart rate, an inter beat interval, a blood oxygen saturation, and a blood pressure of the worker.

2. The system of claim 1, wherein the hardware part further comprises:
- a communication device configured to enable the worker to write and send messages to the processing, controlling, and display part through the networks that are in connection with the helmet; and
- a central server configured to receive the vital data and the messages from the short range network.

3. The system of claim 1, wherein the long range network is configured to transmit the vital data along long distances in open spaces.

4. The system of claim 1, wherein the short range network is configured to transmit the vital data along short distances in closed spaces.

5. The system of claim 1, wherein the networks further comprise:
- transmission equipment comprising plural antennas in open spaces for the long range network and plural beacons in closed spaces for the short range network; and
- an internet connection configured to transmit the vital data from the central server to the processing, controlling, and display part.

6. The system of claim 5, wherein the internet connection is achieved through a cellular, a satellite global system for mobile network, a wireless local area network, or a local area network.

7. The system of claim 1, wherein the cloud storage comprises:
- a workforce module configured to analyze and report the vital data;
- a training module configured to record and track all training courses for the worker; and
- an assets module configured to track a location and status of workplace equipment and ensure that the workplace equipment is safely operated by trained or authorized workers.

8. The system of claim 1, wherein the cloud storage further comprises:
- a Geofence module configured to identify a frame of a workplace and detect unauthorized entries to the workplace;
- a reporting module configured to report safety incidents on a safety dashboard; and
- an artificial intelligence and machine learning module configured to predict any safety incident based on the vital data after analysis.

9. The system of claim 1, wherein the helmet further comprises;
- a cable and a connector plugged into a port in order to connect the plurality of sensors with an electronic processing unit;
- an emergency button configured to be used when the worker is in an emergency situation and needs support; and
- a location sensor configured to communicate with a plurality of systems for determining a location of the helmet.

10. A plurality of the system of claim 1, configured as
- a Real Location Time System "RLTS" configured to determine the location of the helmet inside closed spaces, and
- a Global Positioning System "GPS" configured to determine the location of the helmet in open spaces.

11. The system of claim 9, wherein the electronic processing unit is configured to
- receive more than one reading of each parameter of the vital data with different levels of confidence from the plurality of sensors,
- select a reading with highest level of confidence to be sent, and
- regulate a frequency of measurements process.

12. The system of claim 1, wherein the helmet (101) further comprises:
- a power unit configured to power the plurality of sensors; and
- an embedded antenna configured to send the vital data from the helmet.

13. The system of claim 12, wherein the power unit comprises a rechargeable battery configured to store electric energy needed to operate the helmet;

a thin film photovoltaic panel shielding the helmet and configured to charge the rechargeable battery;

a charging port configured to conventionally charge the rechargeable battery;

an electric converter configured to convert AC power to DC power; and a blocking diode configured to protect the thin film photovoltaic panel from electric current back flow.

14. The system of claim 1, wherein the helmet further comprises a vibrator and a speaker configured to alarm the worker in an emergency.

15. The system of claim 1, wherein the helmet further comprises:

a microphone configured to enable the worker to send voice messages to the processing, controlling, and display part through the networks in connection with the helmet.

16. The system of claim 1, wherein the plurality of sensors further comprise:

a piezoelectric sensor configured to detect motion of the worker.

17. A method of safety management using the system of claim 1, the method comprises:

deploying and installing the hardware part, the networks, and the processing, controlling and display part;

gathering the vital data by the plurality of sensors with different levels of confidence for a worker wearing the helmet;

filtering the vital data and choosing the vital data having the highest level of confidence by an electronic processing unit;

receiving messages sent from a communication device and microphone by the electronic processing unit;

determining a location of the worker using one or more conventional positioning systems and the location sensor added to the helmet;

transmitting filtered and chosen vital data and messages via a plurality of antennas through the long range network in open spaces and by via a plurality of beacons through the short range network in closed spaces until the filtered and chosen vital data and messages reach to the central server;

transmitting the vital data and messages received the central server through an internet connection to a cloud storage;

analyzing the vital data and messages received by cloud storage modules, a workforce module, a training module, an assets module, a Geofence module, a reporting module, and an artificial intelligence and machine learning module; and displaying the vital data and messages after analysis on a safety dashboard.

18. A worker health monitoring system, comprising:

a plurality of workers, each wearing the system of claim 1.

19. The worker health monitoring system of claim 18, wherein the plurality of workers comprises at least 25 workers.

20. A method of detecting a health or environmental event among a plurality of workers, the method comprising:

obtaining from the sensors of the system of claim 1, signals from at least 25 workers over a workday;

transmitting the signals via long-and short-range networks to a central processor; and analyzing aggregated worker data to a detect group event, wherein the group event comprises hypoxia, a gas leak, or an infectious outbreak.

* * * * *